United States Patent
Theertham et al.

(10) Patent No.: US 11,572,796 B2
(45) Date of Patent: Feb. 7, 2023

(54) MULTI-MATERIAL VANE FOR A GAS TURBINE ENGINE

(71) Applicant: Raytheon Technologies Corporation, Farmington, CT (US)

(72) Inventors: Arun K. Theertham, Rocky Hill, CT (US); Andrew Pope, Glendale, NY (US)

(73) Assignee: Raytheon Technologies Corporation, Farmington, CT (US)

( * ) Notice: Subject to any disclaimer, the term of this patent is extended or adjusted under 35 U.S.C. 154(b) by 3 days.

(21) Appl. No.: 16/851,870

(22) Filed: Apr. 17, 2020

(65) Prior Publication Data

US 2021/0324751 A1  Oct. 21, 2021

(51) Int. Cl.
*F01D 9/02* (2006.01)
*F01D 5/14* (2006.01)

(52) U.S. Cl.
CPC ............... *F01D 9/02* (2013.01); *F01D 5/147* (2013.01); *F05D 2240/12* (2013.01); *F05D 2240/121* (2013.01); *F05D 2240/122* (2013.01)

(58) Field of Classification Search
CPC ..... F01D 9/00; F01D 9/02; F01D 9/04; F01D 9/041; F01D 9/042; F01D 5/14; F01D 5/147; F01D 5/28; F01D 5/282; F01D 5/284; F01D 5/286; F01D 25/005; F05D 2240/12; F05D 2240/121; F05D 2240/122
See application file for complete search history.

(56) References Cited

U.S. PATENT DOCUMENTS

| | | | |
|---|---|---|---|
| 3,002,717 | A | 10/1961 | Pavlecka |
| 3,060,561 | A | 10/1962 | Watter |
| 3,903,578 | A | 9/1975 | Rothman |
| 4,029,838 | A | 6/1977 | Chamis |
| 4,118,147 | A | 10/1978 | Ellis |
| 4,671,470 | A | 6/1987 | Jonas |
| 4,808,485 | A | 2/1989 | Prewo |
| 4,885,212 | A | 12/1989 | Prewo |
| 4,911,990 | A | 3/1990 | Prewo |
| 4,999,256 | A | 3/1991 | Prewo |
| 5,015,116 | A | 5/1991 | Nardone |

(Continued)

OTHER PUBLICATIONS

EP search report for EP21169000.3 dated Sep. 22, 2021.
Office action for U.S. Appl. No. 16/851,911 dated Jul. 22, 2021.

*Primary Examiner* — Eldon T Brockman
*Assistant Examiner* — Elton K Wong
(74) *Attorney, Agent, or Firm* — Getz Balich LLC

(57) ABSTRACT

A multi-material vane includes an airfoil extending longitudinally between a leading edge and a trailing edge. The airfoil extends spanwise between an inner end and an outer end. The airfoil extends laterally between a first side and a second side. The airfoil includes a base section, a first side section, a second side section and a sheath. The base section extends along the span line between the inner end and the outer end. The base section is laterally between the first side section and the second side section. The first side section is connected to the base section and partially forms the first side of the airfoil. The second side section is connected to the base section and partially forms the second side of the airfoil. The sheath at least partially forming an edge of the airfoil. The edge is the leading edge or the trailing edge of the airfoil.

20 Claims, 10 Drawing Sheets

(56) References Cited

U.S. PATENT DOCUMENTS

| | | |
|---|---|---|
| 5,079,099 A | 1/1992 | Prewo |
| 5,295,789 A | 3/1994 | Daguet |
| 5,366,765 A | 11/1994 | Milaniak |
| 5,370,831 A | 12/1994 | Blair |
| 5,407,326 A | 4/1995 | Lardellier |
| 5,634,771 A | 6/1997 | Howard |
| 5,692,881 A | 12/1997 | Leibfried |
| 5,797,239 A | 8/1998 | Zaccone |
| 5,913,661 A | 6/1999 | Panovsky |
| 5,931,641 A | 8/1999 | Finn |
| 5,947,688 A | 9/1999 | Schilling |
| 6,033,186 A | 3/2000 | Schilling |
| 6,039,542 A | 3/2000 | Schilling |
| 6,139,278 A | 10/2000 | Mowbray |
| 6,287,080 B1 | 9/2001 | Evans |
| 6,364,616 B1 | 4/2002 | Stevenson |
| 6,371,725 B1 * | 4/2002 | Manteiga ............ F01D 5/14 415/209.4 |
| 6,514,046 B1 | 2/2003 | Morrison |
| 6,739,381 B2 | 5/2004 | Esser |
| 6,743,504 B1 | 6/2004 | Allen |
| 7,144,222 B2 | 12/2006 | Lanni |
| 7,240,718 B2 | 7/2007 | Schmidt |
| 7,334,997 B2 | 2/2008 | Karafillis |
| 7,410,342 B2 | 8/2008 | Matheny |
| 7,508,466 B2 | 3/2009 | Hutchins |
| 7,766,625 B2 | 8/2010 | Burdgick |
| 7,794,197 B2 | 9/2010 | Thompson |
| 7,841,730 B2 | 11/2010 | Hara |
| 7,845,841 B2 | 12/2010 | Sampsell |
| 7,942,639 B2 | 5/2011 | Burdgick |
| 7,955,054 B2 | 6/2011 | El-Aini |
| 7,969,532 B2 | 6/2011 | Mizushima |
| 8,009,243 B2 | 8/2011 | Chen |
| 8,083,489 B2 | 12/2011 | Viens |
| 8,585,268 B2 | 11/2013 | Yankov |
| 8,821,124 B2 | 9/2014 | Viens |
| 2005/0247818 A1 | 11/2005 | Prichard |
| 2005/0249601 A1 | 11/2005 | Burdgick |
| 2007/0292274 A1 | 12/2007 | Burdgick |
| 2008/0159856 A1 | 7/2008 | Moniz |
| 2008/0253885 A1 | 10/2008 | Foose |
| 2008/0253887 A1 * | 10/2008 | Cairo ............ F04D 29/023 415/221 |
| 2008/0259247 A1 | 10/2008 | Stuart |
| 2009/0317238 A1 | 12/2009 | Wood |
| 2010/0104446 A1 * | 4/2010 | Vehr ............ F01D 5/147 416/226 |
| 2010/0129651 A1 | 5/2010 | Schreiber |
| 2010/0209235 A1 | 8/2010 | Shim |
| 2011/0026270 A1 | 2/2011 | Onishi |
| 2011/0070092 A1 | 3/2011 | Gerlach |
| 2011/0194307 A1 | 8/2011 | Chen |
| 2011/0199559 A1 | 8/2011 | Nakamura |
| 2011/0199670 A1 | 8/2011 | Chen |
| 2011/0199786 A1 | 8/2011 | Uchida |
| 2011/0205453 A1 | 8/2011 | Kasai |
| 2011/0205756 A1 | 8/2011 | Kim |
| 2011/0211368 A1 | 9/2011 | Mishima |
| 2013/0139010 A1 | 5/2013 | Chickanosky |
| 2013/0251519 A1 | 9/2013 | Dunleavy |
| 2013/0294920 A1 * | 11/2013 | Klein ............ B23K 15/06 416/229 A |
| 2014/0010662 A1 | 1/2014 | Duelm |
| 2016/0258297 A1 * | 9/2016 | Cortequisse ............ F01D 5/282 |
| 2017/0282466 A1 * | 10/2017 | Backhouse ............ B29C 70/382 |
| 2017/0292531 A1 | 10/2017 | Snyder |
| 2018/0030995 A1 * | 2/2018 | Weisse ............ F01D 5/282 |
| 2018/0347397 A1 * | 12/2018 | Clum ............ F01D 9/041 |
| 2020/0003061 A1 * | 1/2020 | Lanfant ............ B29C 70/86 |
| 2020/0040742 A1 | 2/2020 | Fromonteil |

\* cited by examiner

FIG. 1

MULTI-MATERIAL VANE FOR A GAS TURBINE ENGINE

BACKGROUND OF THE DISCLOSURE

1. Technical Field

This disclosure relates generally to a gas turbine engine and, more particularly, to a vane/vane assembly for a gas turbine engine.

2. Background Information

Various types and configurations of vanes, such as structural guide vanes for a gas turbine engine, are known in the art. While these known vanes have various benefits, there is still room in the art for improvement. For example, there is a need in the art for a light weight structural guide vane which is relatively simple to manufacture.

SUMMARY OF THE DISCLOSURE

According to an aspect of the present disclosure, a vane is provided for a gas turbine engine. This vane includes an airfoil extending along a camber line between a leading edge and a trailing edge. The airfoil extends along a span line between an inner end and an outer end. The airfoil extends laterally between a first side and a second side. The airfoil includes a base section, a first side section, a second side section and a sheath. The base section extends along the span line between the inner end and the outer end. The base section is laterally between the first side section and the second side section. The base section is configured from or otherwise includes metal material. The first side section is connected to the base section and partially forms the first side of the airfoil. The first side section is configured from or otherwise includes first non-metal material. The second side section is connected to the base section and partially forms the second side of the airfoil. The second side section is configured from or otherwise includes second non-metal material. The sheath at least partially forms an edge of the airfoil. The edge may be the leading edge or the trailing edge of the airfoil.

According to another aspect of the present disclosure, another vane is provided for a gas turbine engine. This vane includes an airfoil extending longitudinally between a first edge and a second edge. The airfoil extends spanwise between an inner end and an outer end. The airfoil extends laterally between a first side and a second side. The airfoil includes a base section, a first side section, a second side section and a sheath. The base section is laterally between the first side section and the second side section. The base section is configured from or otherwise includes metal material. The first side section is connected to the base section and partially forms the first side of the airfoil. The first side section is configured from or otherwise includes first non-metal material. The second side section is connected to the base section and partially forms the second side of the airfoil. The second side section is configured from or otherwise includes second non-metal material. The sheath partially forms an exterior surface of the airfoil and is attached to the base section.

According to still another aspect of the present disclosure, still another vane is provided for a gas turbine engine. This vane includes an inner platform, an outer platform and an airfoil. The airfoil extends longitudinally between a first edge and a second edge. The airfoil extends spanwise between the inner platform and the outer platform. The airfoil extends laterally between a first side and a second side. The airfoil includes a base section, a first side section and a sheath. The base section extends spanwise between and is formed integrally with the inner platform and the outer platform. The base section is configured from or otherwise includes metal material. The first side section is connected to the base section and partially forms the first side of the airfoil. The first side section is configured from or otherwise includes first non-metal material. The sheath at least partially forms the first edge of the airfoil.

The airfoil may also include a second side section. The base may be laterally between and may provide a divider between the first side section and the second side section. The second side section may be connected to the base section and may partially form the second side of the airfoil. The second side section may be configured from or otherwise include second non-metal material.

The sheath may completely form the edge of the airfoil.

The edge of the airfoil may be the leading edge of the airfoil.

The edge of the airfoil may be the trailing edge of the airfoil.

The edge of the airfoil may be the leading edge of the airfoil. The airfoil may also include a second sheath at least partially forming the trailing edge of the airfoil.

The sheath may be bonded to the base section, the first side section and the second side section.

The airfoil may have a span length extending along the span line between the inner end and the outer end of the airfoil. An end-to-end length of the first side section along the span line may be less than the span length.

The airfoil may have a span length extending along the span line between the inner end and the outer end of the airfoil. An end-to-end length of the second side section along the span line may be less than the span length.

The airfoil may have an inner end portion at the inner end. The airfoil may have an outer end portion at the outer end. The airfoil may have an intermediate portion extending along the span line between the inner end portion and the outer end portion. At least the base section, the first side section, the second side section and the sheath may collectively form the intermediate portion. At least the base section and the sheath may collectively form the inner end portion and/or the outer end portion.

The first side section may not form the inner end portion and/or the outer end portion. In addition or alternatively, the second side section may not form the inner end portion and/or the outer end portion.

The first side section may abut against the base section in a spanwise direction. In addition or alternatively, the second side section may abut against the base section in the spanwise direction.

The base section may extend along the camber line through a channel which is laterally between the first side section and the second side section.

The base section may have a first portion and a second portion aligned along the camber line. The first portion may be between the second portion and one of the inner end and the outer end along the span line. The first portion may have a first lateral thickness. The second portion may have a second lateral thickness that is less than the first lateral thickness. The first side section and/or the second side section may overlap and may be connected to the first portion and the second portion.

The vane may also include an inner platform. The base section may extend along the span line to and/or may be formed integrally with the inner platform.

The vane may also include an outer platform. The base section may extend along the span line to and/or may be formed integrally with the outer platform.

The base section may be configured as an aperture free body at least between the first side section and the second side section.

The first non-metal material may be configured from or otherwise include fiber-reinforced composite material. In addition or alternatively, the second non-metal material may be configured from or otherwise include fiber-reinforced composite material.

The vane may be configured as a structural guide vane of the gas turbine engine.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 1 is an illustration of a first side of a vane for a gas turbine engine.

DETAILED DESCRIPTION

Figure 1:
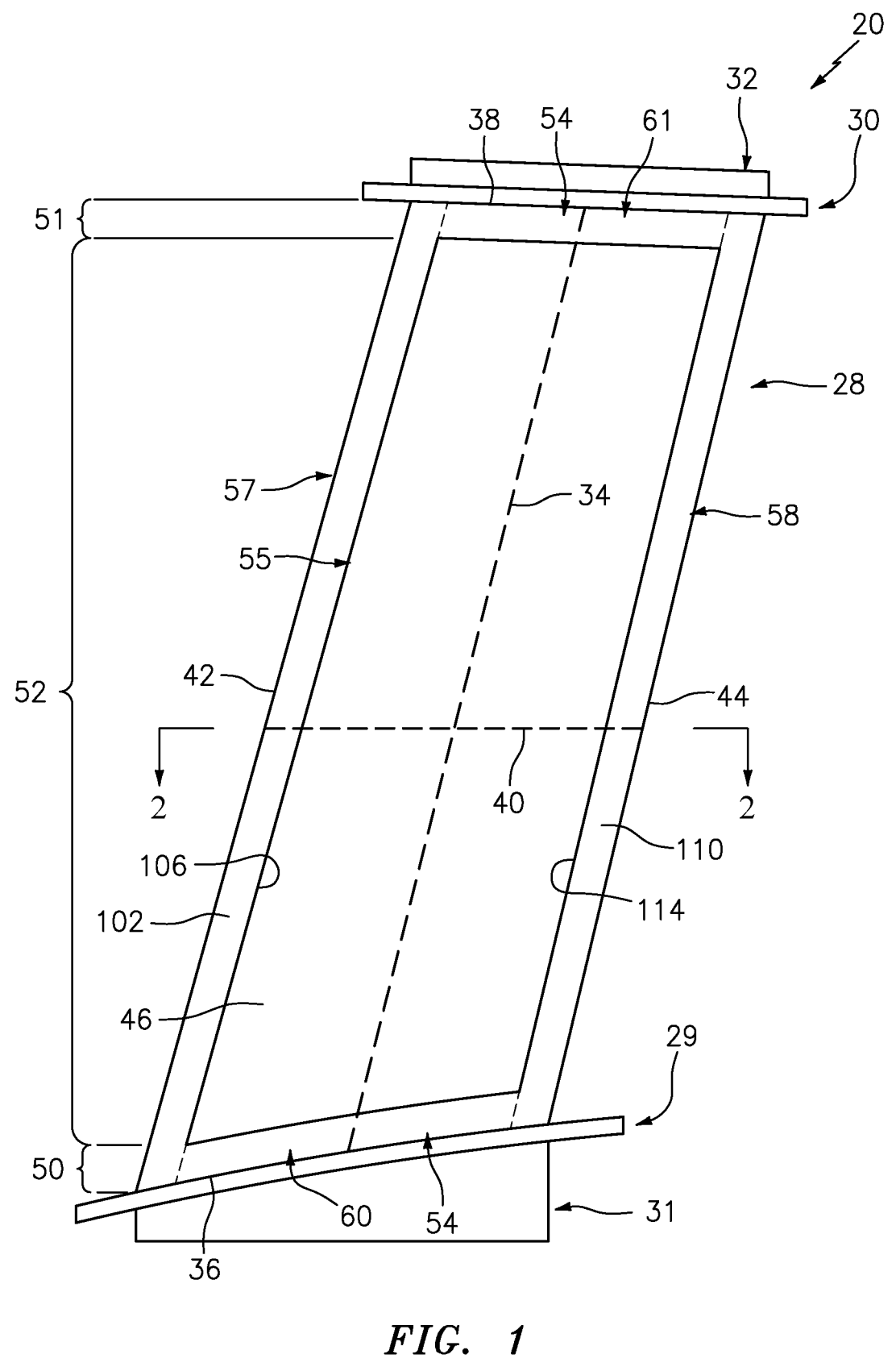
Figure 2:
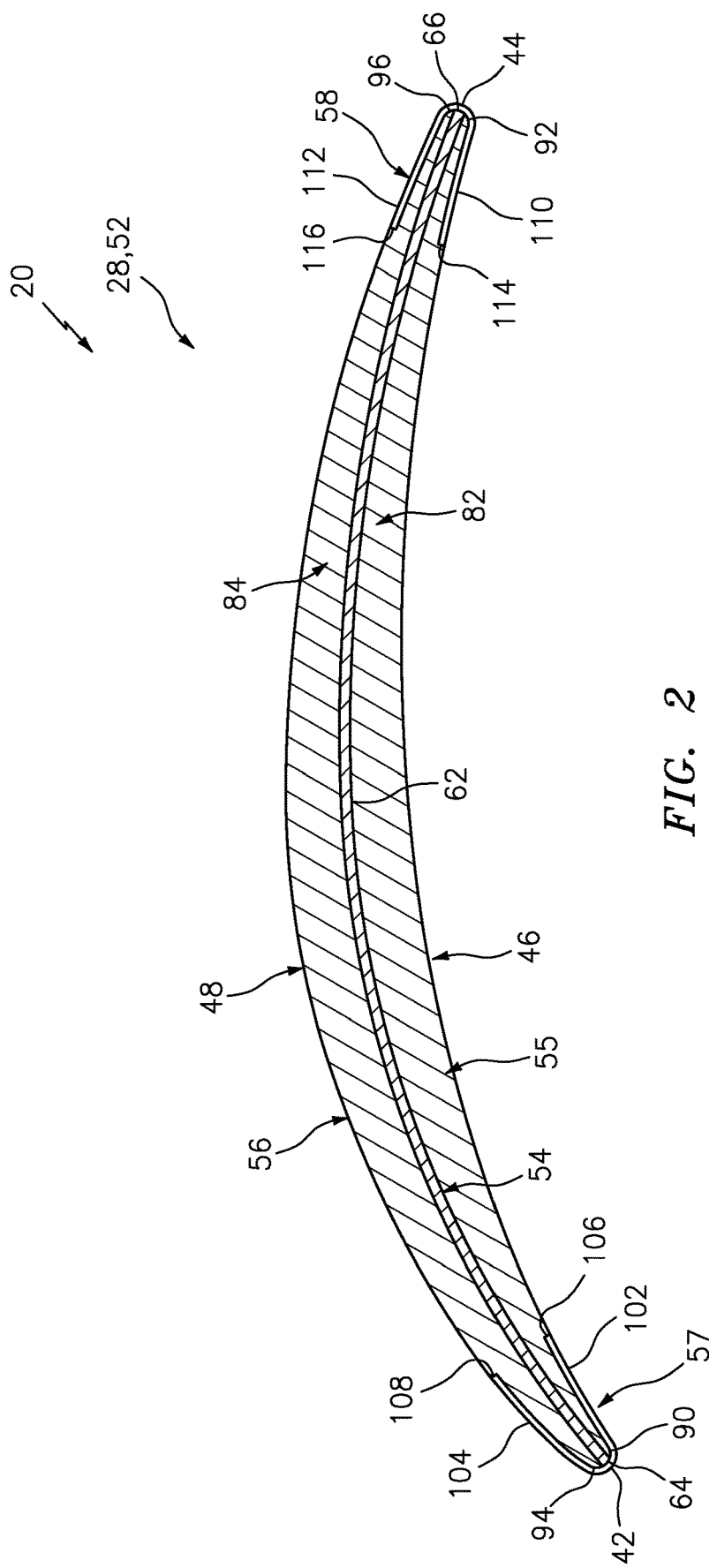
FIG. 2 is a cross-sectional illustration of the vane taken along line 2-2 in FIG. 1.

FIGS. 1 and 2 illustrate a multi-material vane 20 (e.g., a metal-composite vane) for a gas turbine engine. This vane 20 may be configured as a structural guide vane; e.g., a structural exit guide vane. For example, referring to FIG. 3, the vane 20 may extend between and be structurally tied to an inner structure 22 of the gas turbine engine and an outer structure 24 of the gas turbine engine. With such a configuration, the vane 20 is configured to transfer loads between the inner structure 22 and the outer structure 24. The vane 20 may also or alternatively be configured to direct flow within a flowpath 26 (e.g., a bypass flowpath) of the gas turbine engine. The vane 20 of the present disclosure, however, is not limited to such an exemplary vane configuration or arrangement within the gas turbine engine.

Referring to FIG. 1, the vane 20 includes a vane airfoil 28, a vane inner platform 29 (e.g., a shroud segment) and a vane outer platform 30 (e.g., a shroud segment). The vane 20 of FIG. 1 also include a vane inner mount 31 and a vane outer mount 32. Of course, it is contemplated the vane 20 may alternatively be configured without one or more of the vane components 29-32 and/or include one or more additional vane components. For example, in some embodiments, the inner platform 29 and/or the outer platform 30 may be configured discrete from the vane 20.

The vane airfoil 28 of FIG. 1 extends spanwise along a span line 34 between an airfoil inner end 36 and an airfoil outer end 38, where the airfoil outer end 38 is positioned radially outboard of the airfoil inner end 36. The vane airfoil 28 extends longitudinally along a camber line 40 between an (e.g., forward, upstream) airfoil leading edge 42 and an (e.g., aft, downstream) airfoil trailing edge 44. Referring to FIG. 2, the vane airfoil 28 extends laterally (e.g., widthwise) between an (e.g., pressure, concave) airfoil first side 46 and an (e.g., suction, convex) airfoil second side 48. Referring to FIGS. 1 and 2, each of these vane airfoil elements 42, 44, 46 and 48 extends between and to the airfoil inner end 36 and the airfoil outer end 38.

Referring to FIG. 1, the vane airfoil 28 has an airfoil inner end portion 50, an airfoil outer end portion 51 and an airfoil intermediate portion 52. Each of these airfoil portions 50-52 defines a respective part of the airfoil elements 42, 44, 46 and 48; see also FIG. 2. The intermediate portion 52 extends spanwise between and to the inner end portion 50 and the outer end portion 51. The inner end portion 50 is arranged at the airfoil inner end 36, and is connected to the vane inner platform 29. The outer end portion 51 is arranged at the airfoil outer end 38, and is connected to the vane outer platform 30.

Figure 3:
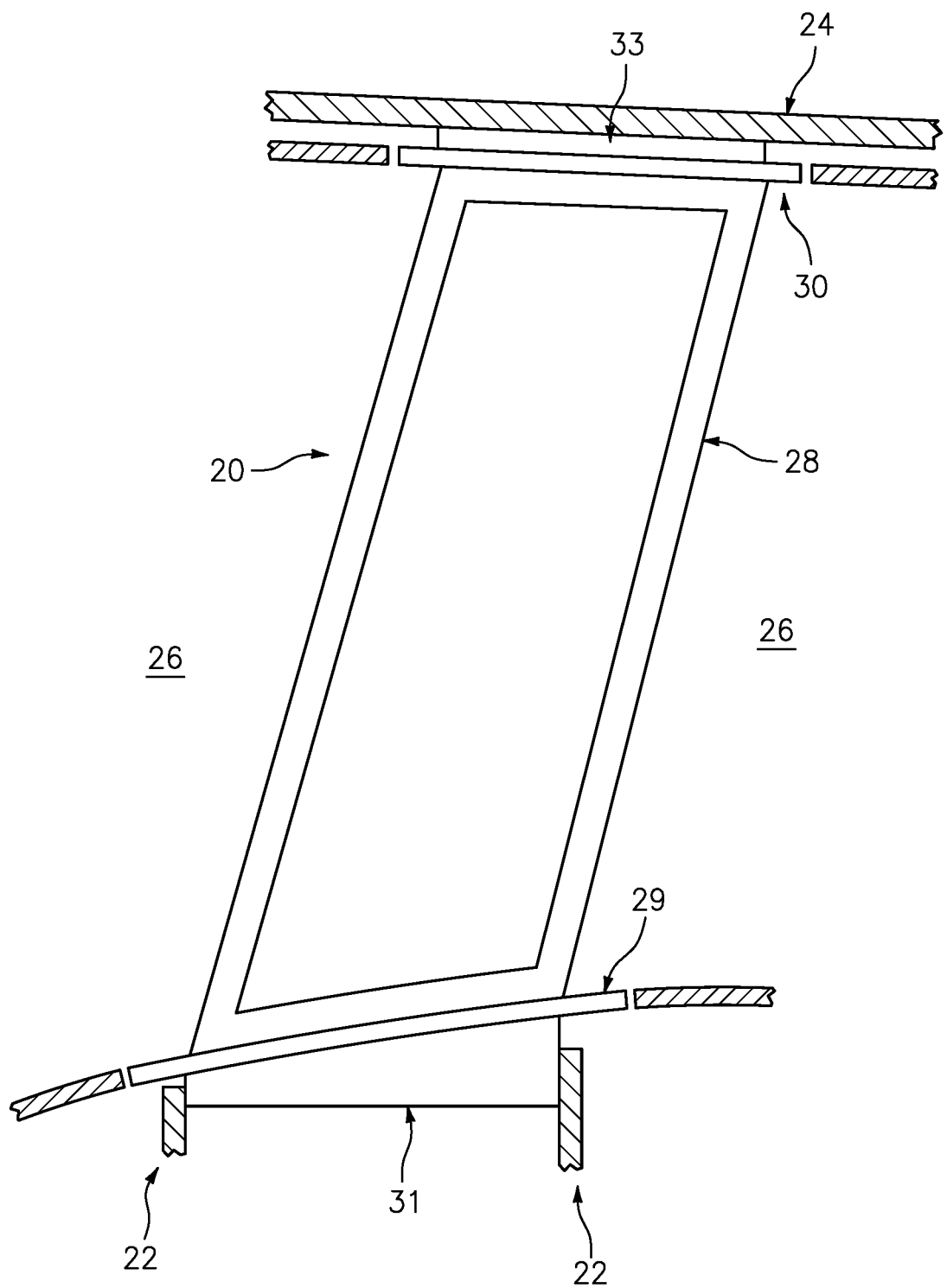
FIG. 3 is a side sectional illustration of a portion of an assembly that includes an array of the vanes (one visible in FIG. 3).

Referring to FIG. 3, the vane inner platform 29 is configured to form an inner peripheral portion of the flowpath 26. The vane outer platform 30 is positioned radially outboard of the vane inner platform 29. The vane outer platform 30 is configured to form an outer peripheral portion of the flowpath 26.

The vane inner mount 31 is configured to attach and structurally tie the vane 20 to the inner structure 22. The vane outer mount 32 is configured to attach and structurally tie the vane 20 to the outer structure 24. Referring to FIG. 1, the vane inner mount 31 is positioned radially inboard of and connected to the vane inner platform 29. The vane outer mount 32 is position radially outboard of and connected to the vane outer platform 30.

The vane airfoil 28 of FIGS. 1 and 2 is configured as a multi-material (e.g., bi-material) airfoil; e.g., a metallic-composite hybrid airfoil. The vane airfoil 28 of FIGS. 1 and 2, for example, includes an airfoil base section 54, one or more airfoil side sections 55 and 56 and one or more sheaths 57 and 58. The base section 54 may be constructed from or otherwise base section material. An example of the base section material is metal such as, but not limited to, steel, titanium (Ti), aluminum (Al), nickel (Ni) or alloys thereof. The first side section 55 may be constructed from or otherwise include first side section non-metal material. The second side section 56 may be constructed from or otherwise include second side section non-metal material, which second side section non-metal material may be the same or different than the first side section non-metal material.

Examples of the first and the second side section non-metal materials include, but are not limited to, composite materials (e.g., materials including fiber-reinforcement within a polymer matrix, such as carbon fiber and/or fiberglass within a thermoset or thermoplastic matrix). The leading edge sheath 57 may be constructed from or otherwise include leading edge sheath material. The trailing edge sheath 58 may be constructed from or otherwise include trailing edge sheath material, which trailing edge sheath material may be the same or different than the leading edge non-metal material. An example of the leading and the trailing edge sheath material is metal such as, but not limited to, steel, titanium (Ti), aluminum (Al), nickel (Ni) or alloys thereof, which metal may be the same or different than the metal of the base section 54.

Figure 4:
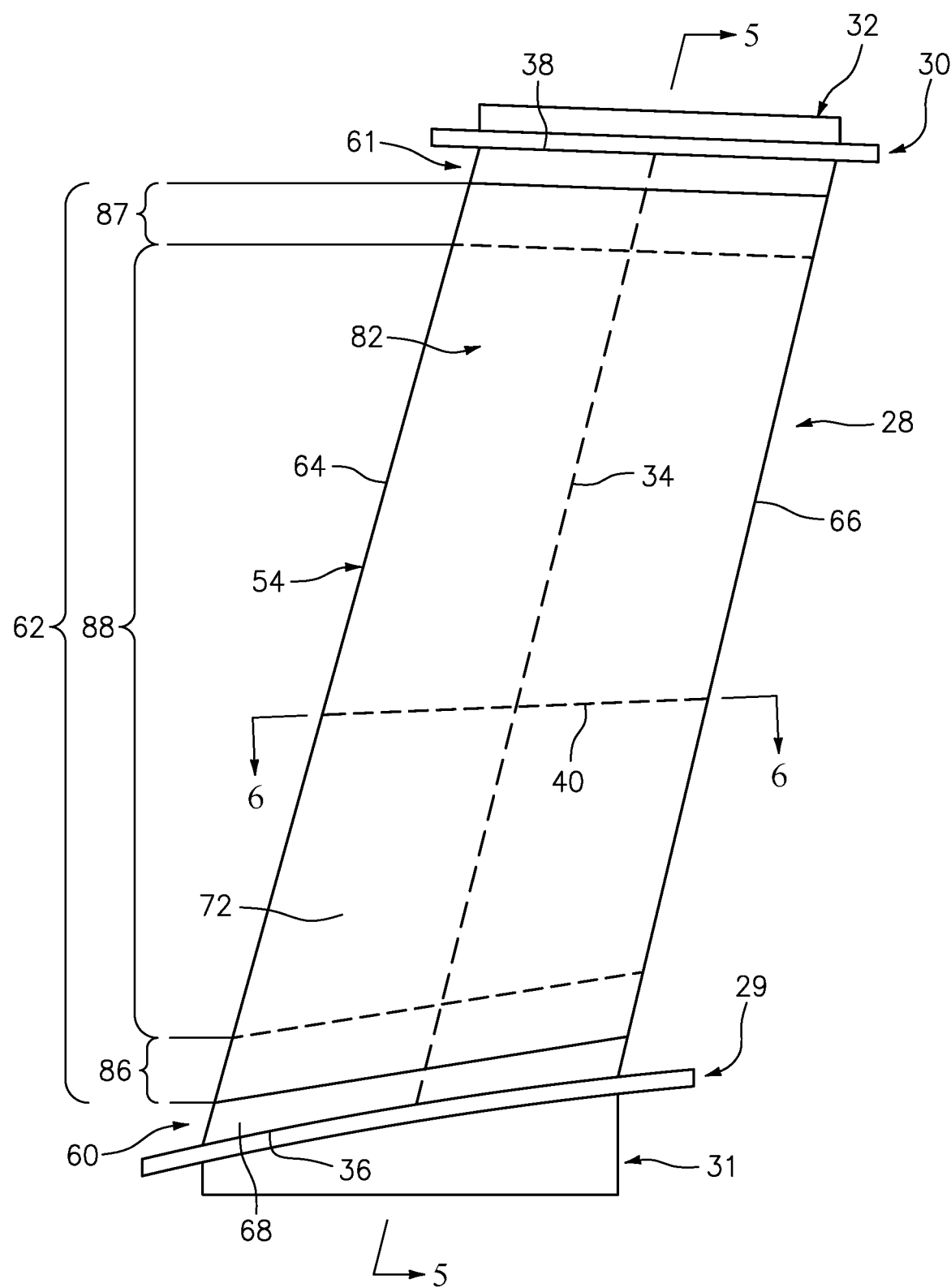
FIG. 4 is an illustration of a first side of the vane without first and second side sections.

Referring to FIG. 4, the base section 54 of the vane airfoil 28 may be configured integrally with one or more or each of the other vane components 29-32. The vane components 28-32 of FIG. 4, for example, are configured together as a monolithic metal body. The vane components 28-32, for example, may be cast, machined, additively manufactured or otherwise formed as a single body of material. The present disclosure, however, is not limited to such an exemplary monolithic metal body embodiment.

Figure 5:
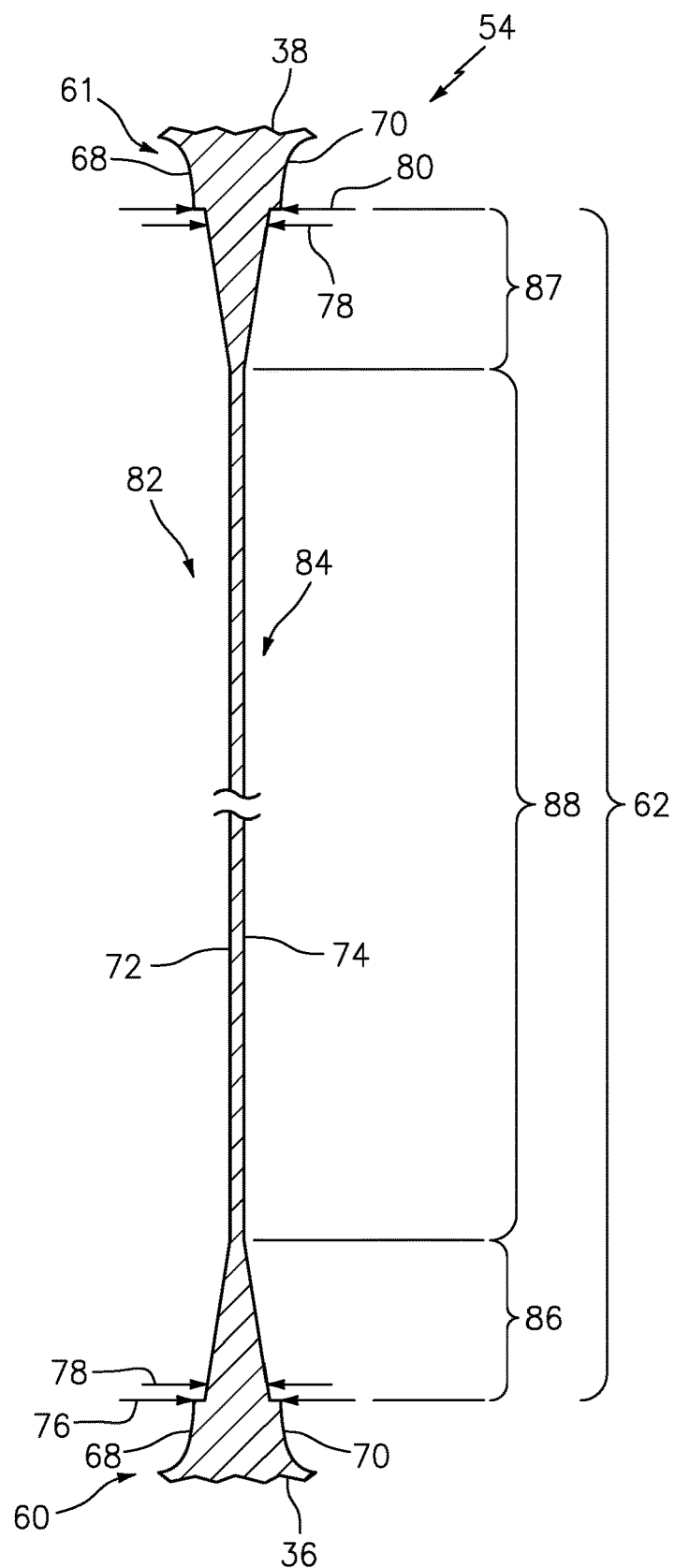
FIG. 5 is a sectional illustration of the FIG. 4 body taken along line 5-5 in FIG. 4.

Referring to FIG. 5, the base section 54 may have an I-beam and/or flared end configuration; e.g., an I-beam and/or flared end cross-sectional geometry when viewed, for example, in a plane perpendicular to the camber line 40. The base section 54 of FIGS. 4 and 5, for example, includes an inner end segment 60, an outer end segment 61 and an intermediate segment 62 where the edge segments 60-61 represent flange portions of the I-beam and/or flared end configuration and the intermediate segment 62 represents a web portion of the I-beam and/or flared end configuration.

The inner end segment 60 of FIG. 4 extends spanwise along the span line 34 from the airfoil inner end 36 to an inner end of the intermediate segment 62. The inner end segment 60 extends longitudinally along the camber line 40 from a leading end 64 of the base section 54 to a trailing end 66 of the base section 54. The inner end segment 60 of FIG. 5 extends laterally between an outer first side 68 of the base section 54 (here, the airfoil first side 46) and an outer second side 70 of the base section 54 (here, the airfoil second side 48). The inner end segment 60 of FIG. 4 provides a transition between the base section 54 and, more generally, the vane airfoil 28 and the vane inner platform 29.

The outer end segment 61 extends spanwise along the span line 34 from the airfoil outer end 38 to an outer end of the intermediate segment 62. The outer end segment 61 extends longitudinally along the camber line 40 from the base section leading end 64 to the base section trailing end 66. The outer end segment 61 of FIG. 5 extends laterally between the base section outer first side 68 (here, the airfoil first side 46) and the base section outer second side 70 (here, the airfoil second side 48). The outer end segment 61 of FIG. 4 provides a transition between the base section 54 and, more generally, the vane airfoil 28 and the vane outer platform 30.

The intermediate segment 62 extends spanwise along the span line 34 from the inner end segment 60 to the outer end segment 61. The intermediate segment 62 of FIGS. 4 and 6 extends longitudinally along the camber line 40 from the base section leading end 64 to the base section trailing end 66. The intermediate segment 62 of FIG. 5 extends laterally between an inner first side 72 of the base section 54 and an inner second side 74 of the base section 54. The base section inner first side 72 is laterally recessed inward (i.e., in a lateral direction towards the base section inner second side 74) from the base section outer first side 68 as well as the airfoil first side 46. The base section inner second side 74 is laterally recessed inward (i.e., in a lateral direction towards the base section inner first side 72) from the base section outer second side 70 as well as the airfoil second side 48.

Referring to FIG. 5, at an interface between the inner end segment 60 and the intermediate segment 62, the inner end segment 60 has a lateral width 76 that is greater than a lateral width 78 of the intermediate segment 62. At an interface between the outer end segment 61 and the intermediate segment 62, the outer end segment 61 has a lateral width 80 that is greater than the lateral width 78 of the intermediate segment 62.

With the foregoing configuration, the base section 54 is configured with one or more recesses 82 and 84; e.g., pockets, channels, etc. The first recess 82 is disposed at the airfoil first side 46 (see FIG. 2) and projects partially into the base section 54 to the intermediate segment 62. The second recess 84 is disposed at the airfoil second side 48 (see FIG. 2) and projects partially into the base section 54 to the intermediate segment 62. The intermediate segment 62, however, (e.g., completely) laterally separates the first recess 82 form the second recess 84. The intermediate segment 62 of FIG. 4 and, more particularly, the entire base section 54, for example, is configured as an aperture free body. The first recess 82 and the second recess 84 may thereby be (e.g., completely) discrete from one another.

Figure 7:
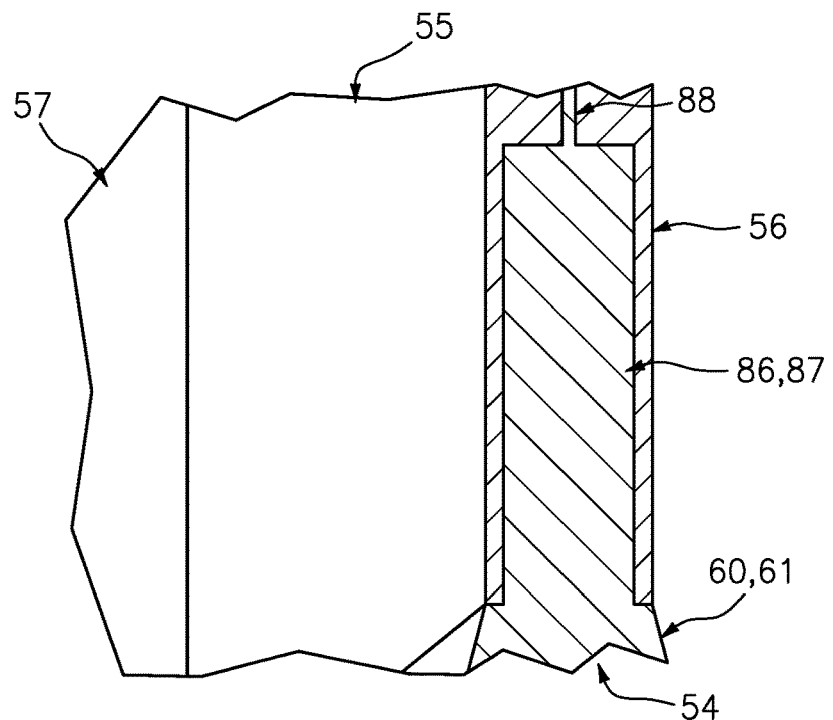
FIG. 7 is a perspective sectional illustration depicting a portion of an interface between an airfoil base section and the first and the second side sections.
Figure 8:
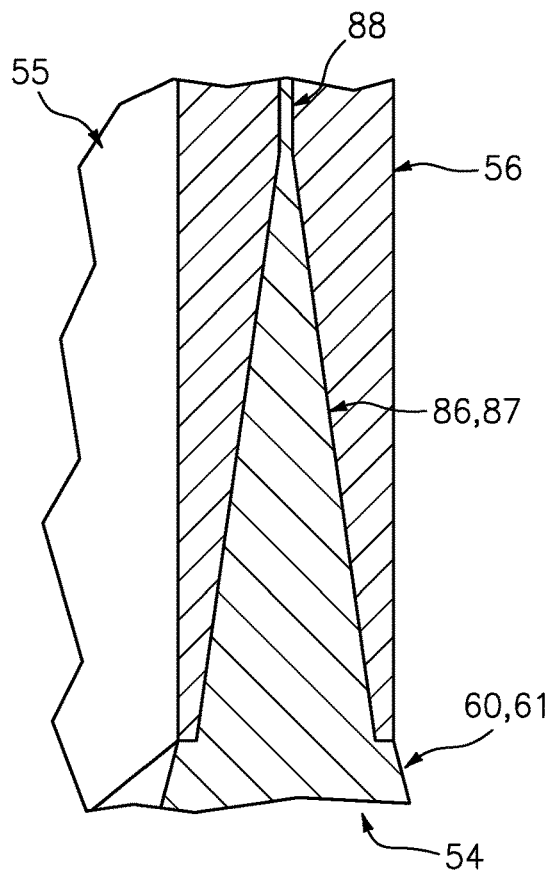
FIG. 8 is a perspective sectional illustration depicting a portion of another interface between the airfoil base section and the first and the second side sections.

The intermediate segment 62 of FIG. 4 includes an intermediate segment inner portion 86, an intermediate segment outer portion 87 and an intermediate segment intermediate portion 88. These intermediate segment portions 86-88 are longitudinally aligned along the camber line 40. The intermediate portion 88 extends spanwise between and to the inner portion 86 and the outer portion 87. Referring to FIG. 5, the inner portion 86 provides a lateral width transition between the inner end segment 60 and the intermediate portion 88 of the intermediate segment 62. Similarly, the outer portion 87 provides a lateral width transition between the outer end segment 61 and the intermediate portion 88 of the intermediate segment 62. For example, referring to FIG. 7, one or each portion 86, 87 may be configured to provide a stepped transition where a lateral width of the portion 86, 87 is less than a lateral width of the end segment 60, 61 and greater than a lateral width of the intermediate portion 88. Referring to FIG. 8, one or each portion 86, 87 may alternatively be configured as a tapered transition where a lateral width of the portion 86, 87 (e.g., smoothly, continuously and/or otherwise) tapers down from the lateral width of the end segment 60, 61 to the lateral width of the intermediate portion 88. The present disclosure, however, is not limited to including such transitions.

Referring to FIGS. 1 and 2, the first side section 55 is arranged at the airfoil first side 46 and connected (e.g., bonded and/or otherwise attached) to the base section 54. The first side section 55 of FIGS. 1 and 2, for example, is seated within the first recess 82 and is connected to the intermediate segment 62.

The first side section 55 extends longitudinally along the camber line 40 from a leading end 90 of the first side section 55 to a trailing end 92 of the first side section 55. The first side section leading end 90 is aligned with and adjacent the base section leading end 64. The first side section trailing end 92 is aligned with and adjacent the base section trailing end 66. The first side section 55 extends spanwise between and spanwise abuts the inner end segment 60 and the outer end segment 61. The first side section 55 extends laterally out from the base section 54 and its intermediate segment 62 to the airfoil first side 46.

The second side section 56 is arranged at the airfoil second side 48 and connected (e.g., bonded and/or otherwise attached) to the base section 54. The second side section 56 of FIGS. 1 and 2, for example, is seated within the second recess 84 and is connected to the intermediate segment 62.

The second side section 56 extends longitudinally along the camber line 40 from a leading end 94 of the second side section 56 to a trailing end 96 of the second side section 56. The second side section leading end 94 is aligned with and adjacent the base section leading end 64. The second side section trailing end 96 is aligned with and adjacent the base section trailing end 66. The second side section 56 extends spanwise between and spanwise abuts the inner end segment 60 and the outer end segment 61. The second side section 56 extends laterally out from the base section 54 and its intermediate segment 62 to the airfoil second side 48.

Figure 9:
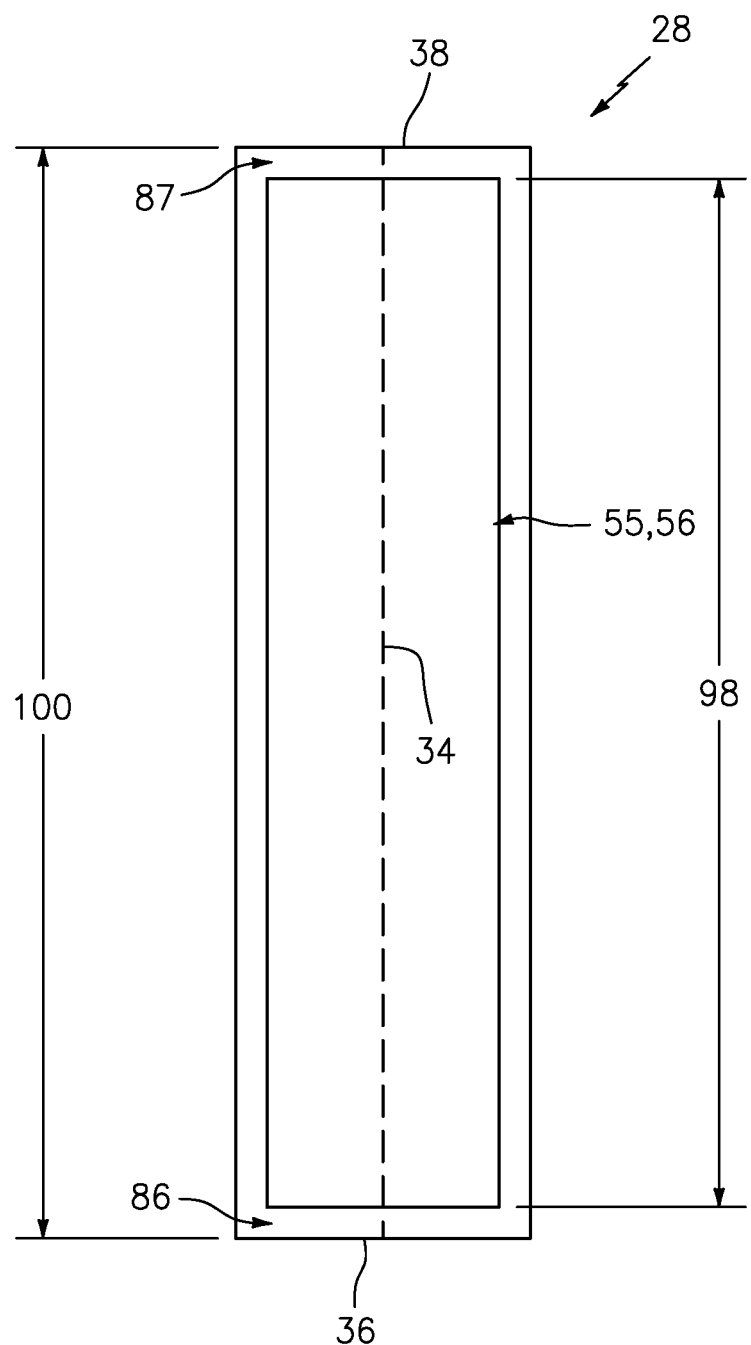
FIG. 9 is a schematic illustration of the vane.

Referring to FIG. 2, since the intermediate segment 62 is aperture free (e.g., solid), the base section 54 and its intermediate segment 62 (e.g., completely) separate the first side section 55 from the second side section 56. This separation may facilitate a relatively low complexity manufacturing process. For example, the first recess 82 may first be (e.g., completely) filled with the first non-metal material to form the first side section 55. The body may then be flipped over and the second recess 84 may then be (e.g., completely) filled with the second non-metal material to form the second side section 56, or vice versa. The present disclosure, however, is not limited to any particular manufacturing techniques or steps Referring to FIG. 9, each side section 55, 56 has an end-to-end length 98 along the span line 34. Each vane airfoil 28 has an end-to-end length 100 (e.g., vane height) along the span line 34. The side section length 98 may be less than the airfoil length 100 due to, for example, provision of the end portions 86 and 87.

Referring again to FIGS. 1 and 2, the leading edge sheath 57 is arranged at (e.g., on, adjacent or proximate) the airfoil leading edge 42. The leading edge sheath 57 is configured to at least partially (e.g., completely) form the airfoil leading edge 42. A first side 102 (e.g., wing) of the leading edge sheath 57 is configured to partially form the airfoil first side 46 and its exterior surface. This first side 102 overlaps and is connected (e.g., directly bonded and/or otherwise attached) to a leading end portion of the first side section 55. A second side 104 (e.g., wing) of the leading edge sheath 57 is configured to partially form the airfoil second side 48 and its exterior surface. This second side 104 overlaps and is connected (e.g., directly bonded and/or otherwise attached) to a leading end portion of the second side section 56. The leading edge sheath 57 also overlaps and is connected (e.g., directly bonded and/or otherwise attached) to the base section 54 at the base section leading end 64. With this configuration, the leading edge sheath 57 provides protection for a leading edge portion of the vane airfoil 28.

Referring to FIG. 1, an aft end 106 of the leading edge sheath first side 102 is longitudinally abutted against and/or next to a first side forward portion (e.g., shelf) of the inner end segment 60. Similarly, an aft end 108 of the leading edge sheath second side 104 is longitudinally abutted against and/or next to a second side forward portion (e.g., shelf) of the inner end segment 60 (not visible in FIG. 1).

The aft end 106 of the leading edge sheath first side 102 is longitudinally abutted against and/or next to a first side forward portion (e.g., shelf) of the outer end segment 61. Similarly, the aft end 108 of the leading edge sheath second side 104 is longitudinally abutted against and/or next to a second side forward portion (e.g., shelf) of the outer end segment 61 (not visible in FIG. 1).

Referring again to FIGS. 1 and 2, the trailing edge sheath 58 is arranged at (e.g., on, adjacent or proximate) the airfoil trailing edge 44. The trailing edge sheath 58 is configured to at least partially (e.g., completely) form the airfoil trailing edge 44. A first side 110 (e.g., wing) of the trailing edge sheath 58 is configured to partially form the airfoil first side 46 and its exterior surface. This first side 110 overlaps and is connected (e.g., directly bonded and/or otherwise attached) to a trailing end portion of the first side section 55. A second side 112 (e.g., wing) of the trailing edge sheath 58 is configured to partially form the airfoil second side 48 and its exterior surface. This second side 112 overlaps and is connected (e.g., directly bonded and/or otherwise attached) to a trailing end portion of the second side section 56. The trailing edge sheath 58 also overlaps and is connected (e.g., directly bonded and/or otherwise attached) to the base section 54 at the base section trailing end 66. With this configuration, the trailing edge sheath 58 provides protection for a trailing edge portion of the vane airfoil 28.

Referring to FIG. 1, a forward end 114 of the trailing edge sheath first side 110 is longitudinally abutted against and/or next to a first side forward portion (e.g., shelf) of the inner end segment 60. Similarly, a forward end 116 of the trailing edge sheath second side 112 is longitudinally abutted against and/or next to a second side forward portion (e.g., shelf) of the inner end segment 60 (not visible in but similar to/a mirror image of arrangement in FIG. 1).

The forward end 114 of the trailing edge sheath first side 110 is longitudinally abutted against and/or next to a first side aft portion (e.g., shelf) of the outer end segment 61. Similarly, the forward end 116 of the trailing edge sheath second side 112 is longitudinally abutted against and/or next to a second side aft portion (e.g., shelf) of the outer end segment 61 (not visible in but similar to/a mirror image of arrangement in FIG. 1).

With the above described arrangement, the first side section 55 is configured to form a portion of the airfoil first side 46 and the exterior flow surface of the vane airfoil 28 at that first side 46 that extends longitudinally between the leading edge sheath 57 and the trailing edge sheath 58. The first side section 55, the leading edge sheath 57 and the trailing edge sheath 58 thereby collectively form the intermediate portion 52 of the vane airfoil 28 at its first side 46. By contrast, the base section 54 and its inner end segment 60 along with the leading edge sheath 57 and the trailing edge sheath 58 collectively form the inner end portion 50 of the vane airfoil 28 at its first side 46. Similarly, the base section 54 and its outer end segment 61 along with the leading edge sheath 57 and the trailing edge sheath 58 collectively form the outer end portion 51 of the vane airfoil 28 at its first side 46. The first side section 55 of FIG. 1 does not, however, form the inner end portion 50 nor the outer end portion 51.

Similar to that described above with respect to the airfoil first side 46, the second side section 56 (not visible in but similar to/a mirror image of arrangement in FIG. 1) is configured to form a portion of the airfoil second side 48 and the exterior flow surface of the vane airfoil 28 at that second side 48 that extends longitudinally between the leading edge sheath 57 and the trailing edge sheath 58. The second side section 56, the leading edge sheath 57 and the trailing edge sheath 58 thereby collectively form the intermediate portion 52 of the vane airfoil 28 at its second side 48. By contrast, the base section 54 and its inner end segment 60 along with the leading edge sheath 57 and the trailing edge sheath 58 collectively form the inner end portion 50 of the vane airfoil 28 at its second side 48. Similarly, the base section 54 and its outer end segment 61 along with the leading edge sheath 57 and the trailing edge sheath 58 collectively form the outer end portion 51 of the vane airfoil 28 at its second side 48. The second side section 56 does not, however, form the inner end portion 50 nor the outer end portion 51.

Figure 6:
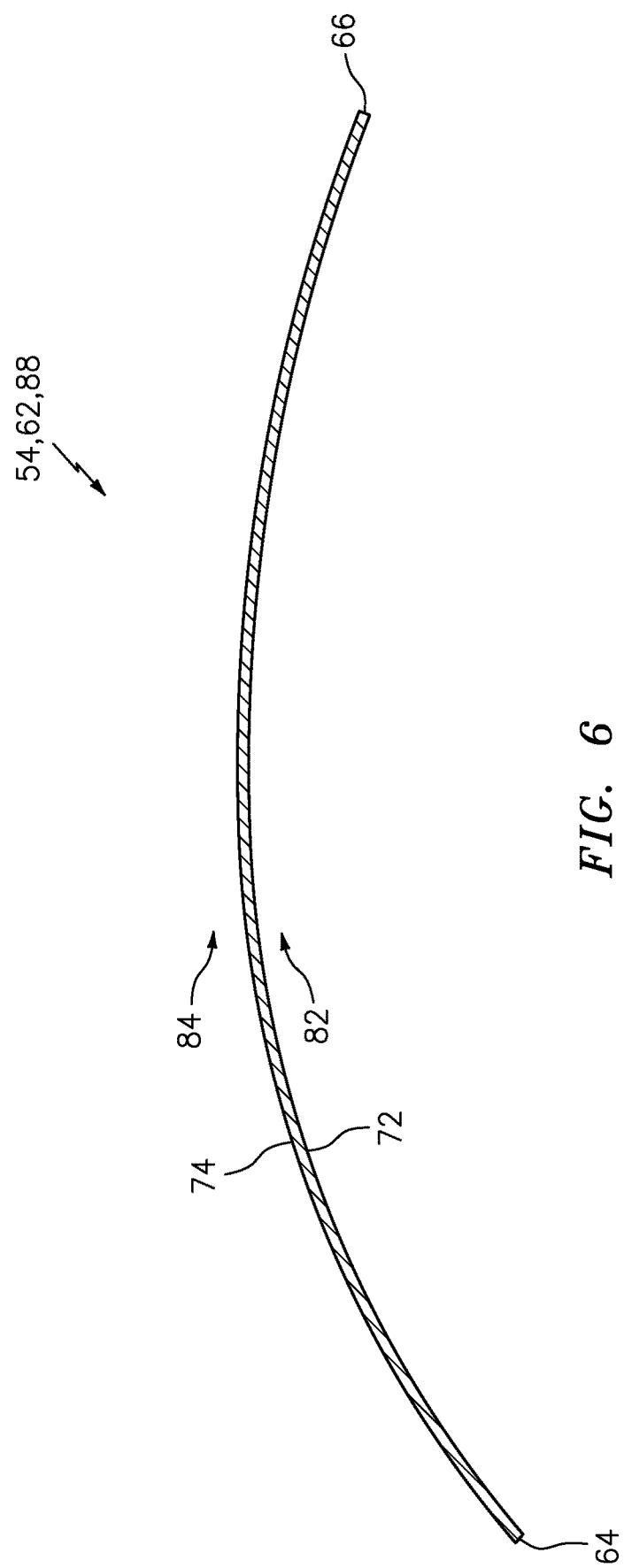
FIG. 6 is a cross-sectional illustration of the FIG. 4 body taken along line 6-6 in FIG. 4.
Figure 10A:
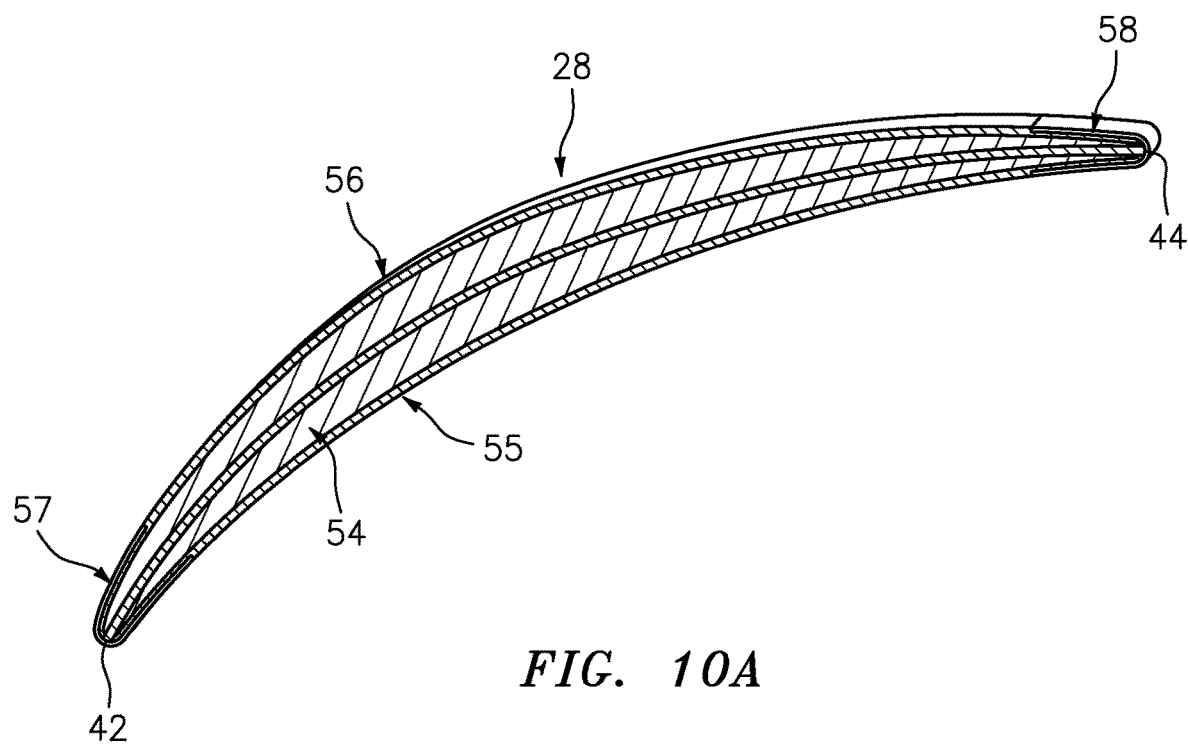
FIG. 10A is a cross-sectional perspective illustration of the vane with an alternative base section configuration.
Figure 10B:
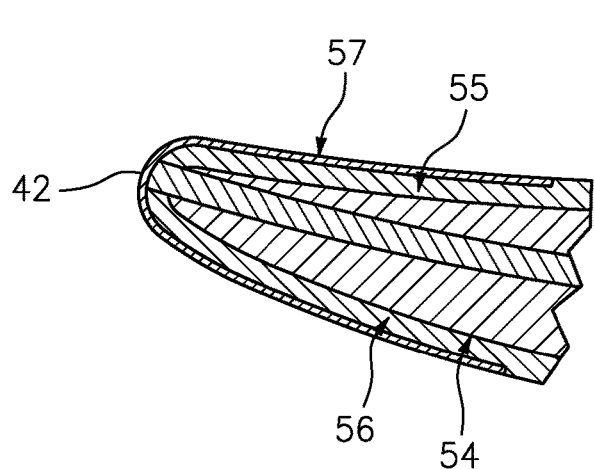
FIG. 10B is an enlarged view of a leading edge portion of the vane in FIG. 10A.
Figure 10C:
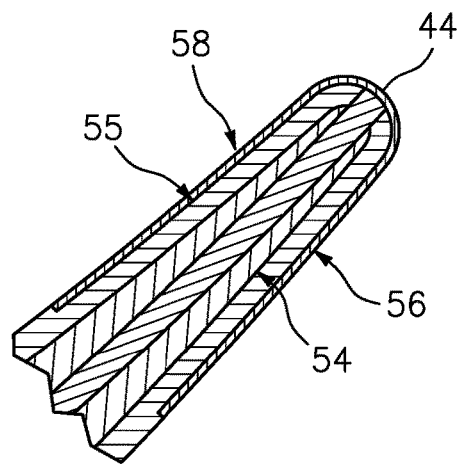
FIG. 10C is an enlarged view of a trailing edge portion of the vane in FIG. 10A.

In some embodiments, referring to FIG. 6, at least a portion of the intermediate segment 62 of the base section 54 may have a relatively constant lateral thickness as intermediate segment 62 extends between the base segment leading end 64 and the base segment trailing end 66. In other embodiments, referring to FIGS. 10A-C, at least a portion of the intermediate segment 62 of the base section 54 may have a changing (e.g., tapering) lateral thickness as intermediate segment 62 extends to its ends 64 and 66.

Figure 11:
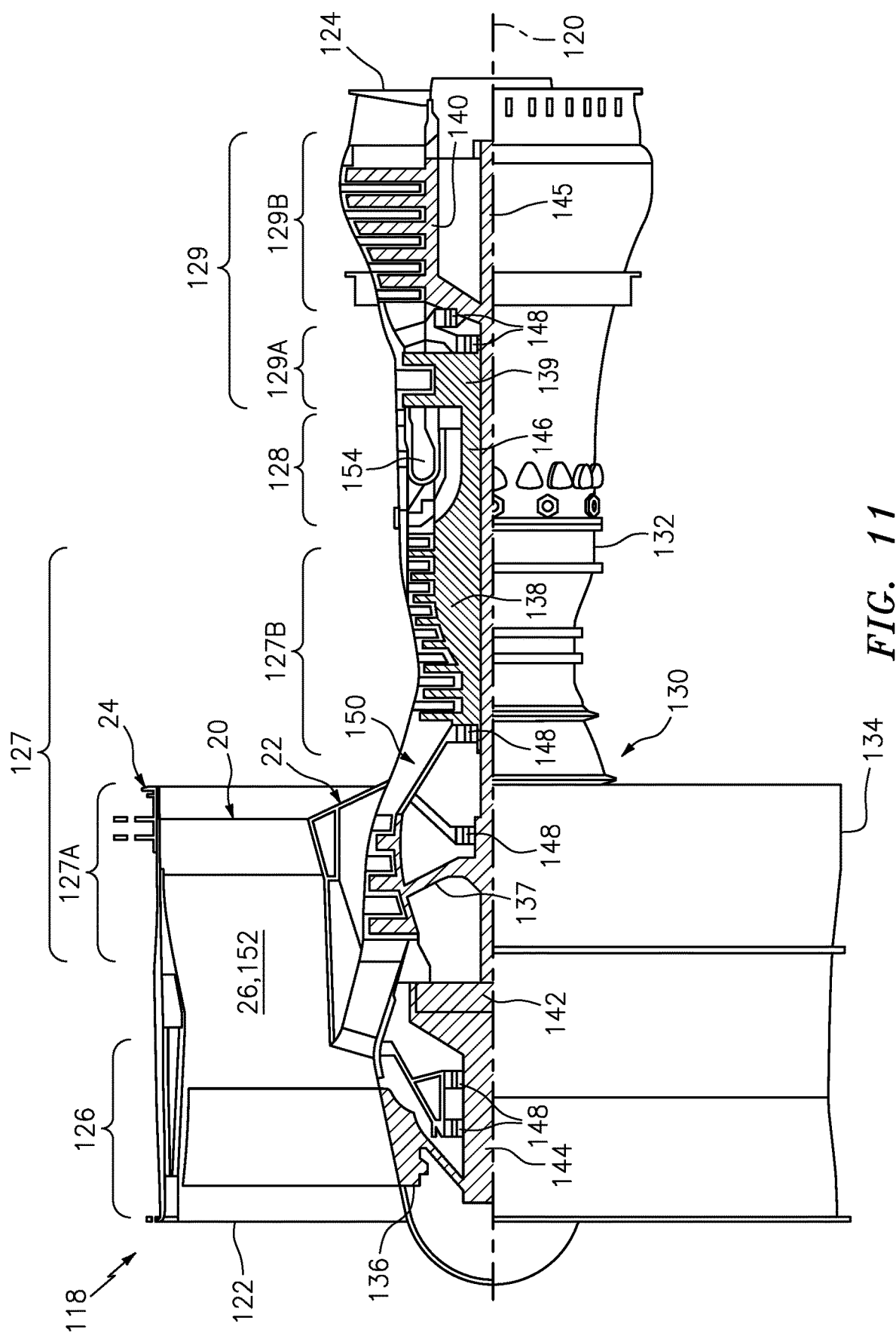
FIG. 11 is a side cutaway illustration of a gas turbine engine configured with a plurality of the vanes (one visible in FIG. 11).

FIG. 11 is a side cutaway illustration of a geared turbine engine 118 which may be configured with one or more (e.g., a circumferential array) of the vanes 20. This turbine engine 118 extends along an axial centerline 120 between an upstream airflow inlet 122 and a downstream airflow exhaust 124. The turbine engine 118 includes a fan section 126, a compressor section 127, a combustor section 128 and a turbine section 129. The compressor section 127 includes a low pressure compressor (LPC) section 127A and a high pressure compressor (HPC) section 127B. The turbine section 129 includes a high pressure turbine (HPT) section 129A and a low pressure turbine (LPT) section 129B.

The engine sections 126-129B are arranged sequentially along the centerline 120 within an engine housing 130. This housing 130 includes an inner case 132 (e.g., a core case) and an outer case 134 (e.g., a fan case). The inner case 132 may house one or more of the engine sections 127A-129B; e.g., an engine core. The inner case 132 is configured with, includes or is part of the inner structure 22. The outer case 134 may house at least the fan section 126. The outer case 134 is configured with, includes or is part of the outer structure 24.

Each of the engine sections 126, 127A, 127B, 129A and 129B includes a respective rotor 136-140. Each of these rotors 136-140 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 136 is connected to a gear train 142, for example, through a fan shaft 144. The gear train 142 and the LPC rotor 137 are connected to and driven by the LPT rotor 140 through a low speed shaft 145. The HPC rotor 138 is connected to and driven by the HPT rotor 139 through a high speed shaft 146. The shafts 144-146 are rotatably supported by a plurality of bearings 148; e.g., rolling element and/or thrust bearings. Each of these bearings 148 is connected to the engine housing 130 by at least one stationary structure such as, for example, an annular support strut.

During operation, air enters the turbine engine 118 through the airflow inlet 122. This air is directed through the fan section 126 and into a core flowpath 150 and a bypass flowpath 152 (e.g., the flowpath 26 of FIG. 3). The core flowpath 150 extends sequentially through the engine sections 127A-129B. The air within the core flowpath 150 may be referred to as "core air". The bypass flowpath 152 extends through a bypass duct, which bypasses the engine core. The air within the bypass flowpath 152 may be referred to as "bypass air".

The core air is compressed by the compressor rotors 137 and 138 and directed into a combustion chamber 154 of a combustor in the combustor section 128. Fuel is injected into the combustion chamber 154 and mixed with the compressed core air to provide a fuel-air mixture. This fuel air mixture is ignited and combustion products thereof flow through and sequentially cause the turbine rotors 139 and 140 to rotate. The rotation of the turbine rotors 139 and 140 respectively drive rotation of the compressor rotors 138 and 137 and, thus, compression of the air received from a core airflow inlet. The rotation of the turbine rotor 140 also drives rotation of the fan rotor 136, which propels bypass air through and out of the bypass flowpath 152. The propulsion of the bypass air may account for a majority of thrust generated by the turbine engine 118, e.g., more than seventy-five percent (75%) of engine thrust. The turbine engine of the present disclosure, however, is not limited to the foregoing exemplary thrust ratio.

The vane 20/an assembly including the vane 20 may be included in various turbine engines other than the one described above. The vane 20, for example, may be included in a geared turbine engine where a gear train connects one or more shafts to one or more rotors in a fan section, a compressor section and/or any other engine section. Alternatively, the vane 20 may be included in a turbine engine configured without a gear train. The vane 20 may be included in a geared or non-geared turbine engine configured with a single spool, with two spools (e.g., see FIG. 11), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A vane for a gas turbine engine, comprising:
an airfoil extending longitudinally between a first edge and a second edge, the airfoil extending spanwise between an inner end and an outer end, the airfoil extending laterally between a first side and a second side, and the airfoil including a base section, a first side section, a second side section and a sheath;
the base section laterally between the first side section and the second side section, and the base section comprising a metal material;
the first side section connected to the base section and partially forming the first side of the airfoil, and the first side section comprising a first non-metal material;
the second side section connected to the base section and partially forming the second side of the airfoil, and the second side section comprising a second non-metal material;
the sheath partially forming an exterior surface of the airfoil and attached to the base section;
the base section including a first section and a second section extending spanwise to the first section;

the first section partially forming the first side and the second side, and the first section abutted spanwise against an end of the first side section and an end of the second side section;

the second section spanwise and longitudinally covered by the first side section and the second side section, the second section including a first portion and a second portion;

the first portion extending spanwise from the first section to the second portion, and the first portion having a first portion lateral thickness that is greater than a second portion lateral thickness of the second portion and that is less than a first section lateral thickness of the first section; and the base section configured with a stepped transition at a spanwise intersection between the first portion and the first section.

2. The vane of claim 1, wherein both the first side section and the second side section
overlap the first portion and the second portion; and
are connected to the first portion and the second portion.

3. The vane of claim 1, wherein the base section laterally tapers as the first portion extends along a span line between the inner end and the outer end to the second portion.

4. The vane of claim 1, wherein the first portion and the second portion are laterally spaced from the first side and the second side at a spanwise intersection between the first portion and the second portion.

5. A gas turbine engine, comprising:
a fan section, a compressor section, a combustor section and a turbine section;
an inner structure housing the compressor section, the combustor section and the turbine section;
an outer structure housing the fan section; and
a structural exit guide vane extending between and structurally tied to the inner structure and the outer structure, the structural exit guide vane configured to transfer loads between the inner structure and the outer structure, the structural exit guide vane comprising the vane of claim 1.

6. The vane of claim 1, wherein
the sheath at least partially forms an edge of the airfoil; and
the edge of the airfoil comprises one of the first edge or the second edge.

7. The vane of claim 6, wherein the sheath completely forms the edge of the airfoil.

8. The vane of claim 6, wherein the edge of the airfoil comprises a leading edge of the airfoil.

9. The vane of claim 6, wherein the edge of the airfoil comprises a trailing edge of the airfoil.

10. The vane of claim 1, wherein
the sheath at least partially forms the first edge; and
the airfoil further includes a second sheath at least partially forming the second edge.

11. The vane of claim 1, wherein the sheath is bonded to the base section, the first side section and the second side section.

12. The vane of claim 1, wherein
the airfoil has a span length extending spanwise along a span line between the inner end and the outer end; and
an end-to-end length of the first side section along the span line is less than the span length.

13. The vane of claim 1, wherein
the airfoil includes an inner end portion at the inner end, an outer end portion at the outer end and an intermediate portion extending spanwise between the inner end portion and the outer end portion;
at least the base section, the first side section, the second side section and the sheath collectively form the intermediate portion; and
at least the base section and the sheath collectively form at least one of the inner end portion or the outer end portion.

14. The vane of claim 13, wherein neither the first side section nor the second side section forms at least one of the inner end portion or the outer end portion.

15. The vane of claim 1, wherein the base section extends longitudinally through a channel which is laterally between the first side section and the second side section.

16. The vane of claim 1, further comprising:
a platform;
the base section extending spanwise to and formed integral with the platform.

17. The vane of claim 1, wherein the base section is configured as an aperture free body at least between the first side section and the second side section.

18. The vane of claim 1, wherein at least one of the first non-metal material or the second non-metal material comprises a fiber-reinforced composite material.

19. The vane of claim 1, wherein the vane is configured as a structural guide vane of the gas turbine engine.

20. A vane for a gas turbine engine, comprising:
an airfoil extending longitudinally between a first edge and a second edge, the airfoil extending spanwise between an inner end and an outer end, the airfoil extending laterally between a first side and a second side, and the airfoil including a base section, a first side section and a second side section;
the base section laterally between the first side section and the second side section, and the base section comprising a metal;
the first side section connected to the base section and partially forming the first side of the airfoil, and the first side section comprising a first non-metal;
the second side section connected to the base section and partially forming the second side of the airfoil, and the second side section comprising a second non-metal;
the base section including a first section and a second section extending spanwise to the first section;
the first section partially forming the first side and the second side, and the first section abutted spanwise against an end of the first side section and an end of the second side section;
the second section spanwise and longitudinally covered by the first side section and the second side section, and the second section including a first portion and a second portion;
the first portion extending spanwise from the first section to the second portion, and the first portion having a first portion lateral thickness that is greater than a second portion lateral thickness of the second portion and that is less than a first section lateral thickness of the first section; and
the base section configured with a stepped transition at a spanwise intersection between the first portion and the first section.

* * * * *